Oct. 28, 1952 P. W. CHARTON 2,616,062
ROTARY FOCUSSED BEAM ELECTRON TUBE
Filed Jan. 25, 1951 3 Sheets-Sheet 1

INVENTOR.
PAUL W. CHARTON
BY
John J. Rogan
ATTORNEY

Oct. 28, 1952      P. W. CHARTON      2,616,062
ROTARY FOCUSSED BEAM ELECTRON TUBE

Filed Jan. 25, 1951      3 Sheets-Sheet 2

INVENTOR.
PAUL W. CHARTON
BY
John J. Rogan
ATTORNEY

Oct. 28, 1952 — P. W. CHARTON — 2,616,062
ROTARY FOCUSSED BEAM ELECTRON TUBE
Filed Jan. 25, 1951
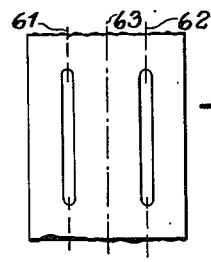
Fig. 7A.
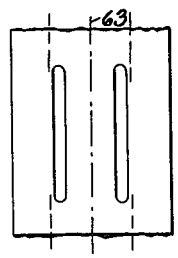
Fig. 20.
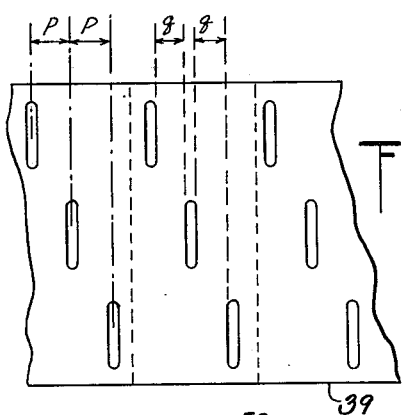
Fig. 5.
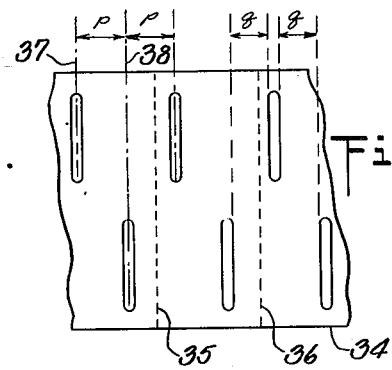
Fig. 4.
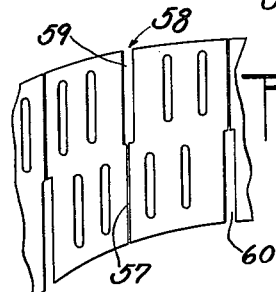
Fig. 7.
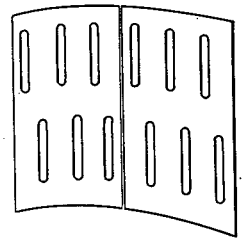
Fig. 6.
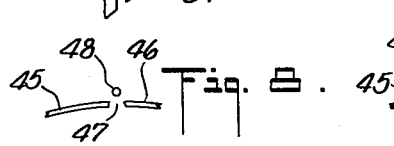
Fig. 8.    Fig. 9.
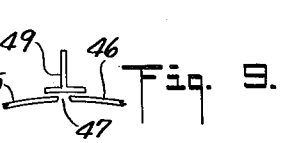
Fig. 10.
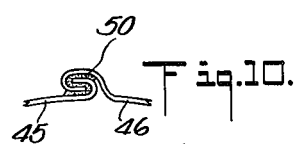
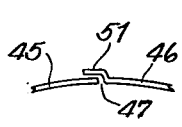
Fig. 11.
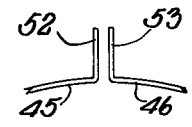
Fig. 12.
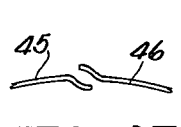
Fig. 13.
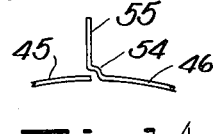
Fig. 14.
INVENTOR.
PAUL W. CHARTON
BY John J. Rogan
ATTORNEY Patented Oct. 28, 1952

2,616,062

UNITED STATES PATENT OFFICE 2,616,062

ROTARY FOCUSED BEAM ELECTRON TUBE

Paul W. Charton, Montclair, N. J., assignor to National Union Radio Corporation, Orange, N. J., a corporation of Delaware Application January 25, 1951, Serial No. 207,757

14 Claims. (Cl. 315—21)

This invention relates to electron tubes, and more especially to tubes of the focussed rotary radial beam type.

The invention is in the nature of an improvement on the kind of tube disclosed in U. S. Letters Patent No. 2,433,403 and further disclosed in the "Proceedings of the I. R. E.," vol. 36, No. 11, November 1948. The said tube employs a central cylindrical cathode surrounded coaxially by a series of slotted screen electrodes in cylindrical segmental array. These screen electrodes are statically electrically biassed with respect to the cathode, and in one form of tube they are energized by a polyphase alternating current in such a way that the electrons from the cathode are focussed into a single radial sheet-like beam which also rotates at a uniform rate around the longitudinal axis of the cathode. In another form of this tube, the rotation and focussing is controlled by the screens and by a polyphase magnetic field.

The said screens are in the form of cylindrical arcuate segments, each segment containing a channel-defining window and with the segments having their adjacent edges spaced to form gaps which likewise act as channel-defining windows or slots. Each window or slot, both those in the screens and those between adjacent screens, is in radial alignment with a corresponding control grid and output anode combination, each of which combination may be allotted to a respective output channel. Such tubes are ideally suited to multiplex telegraphy and telephony, and to telemetering and many other fields of usefulness.

If such a tube is required to control a large number of discrete channels arranged in a singular circular array around the cathode, the mechanical and constructional limitations, as regards the size and spacing between the parts, set a minimum to the inner radius of the channel-forming screens. In other words, the greater the number of channels, the greater must be the diameter of the channel-defining segments or screens. Therefore, the electron trajectory between the cathode and screen segments may become too large for the proper performance of the tube, and results in a proportional reduction of the electron beam current utilizable in the respective output channels.

Accordingly, a principal object of the invention is to provide a novel construction of focussed rotary radial beam tube whereby the number of separate channels can be increased while maintaining, and even improving, the individual channel characteristics.

A feature of the invention relates to a channel-defining electrode structure for rotary focussed beam tubes, wherein the channel-defining windows are arranged in staggered sets in each channel segment. With this arrangement, it is possible to use the same relatively small number of segments on a circle of sufficiently small radius, and also the same small number of phases in the polyphase excitation source, while greatly multiplying the number of controllable discrete output channels.

Another feature relates to a novel construction of channel-defining electrode segments for focussed rotary radial beam tubes.

Another feature relates to a novel construction of channel-defining segments for focussed radial rotary beam tubes, wherein the segments are electrically discrete and have their edges substantially contiguous in whole or in part, while being insulated from each other.

I have found that in a rotary beam tube of the electrostatically focussed type wherein the channel-defining segments are connected to the polyphase source to control the rate of beam rotation, since the said segments are physically separated from each other to provide the gaps as channel-defining windows, if a relatively low number of driving phases is used for excitation of the segments, the instantaneous segment voltage when the rotary electron beam passes a gap, is appreciably lower than when it passes the center of a screen segment. For instance, in a 6-phase 12-channel tube, the voltage at the gap between adjacent segments is only 86.6% of the maximum excitation voltage. If the effective electron beam height is the same at both points, this results in lower channel current characteristics at the gap window as compared with the channel current characteristics at the windows formed in the body of the segment. This requires a different grid cut-off point at the gap windows as compared with the grid cut-off point at the windows in the body of the segments. While this latter non-uniformity can be corrected by the use of different grids at the gap window as compared with the grids at the windows in the body of the segments, nevertheless the characteristics can then be identical for the various channels only for certain voltage conditions. I have found that this disadvantage can be overcome partially or totally, depending upon the number of windows, by reducing the gap or spacing between the adjacent segments to a minimum tolerable with the required insulation, and by forming each segment with the windows symmetrically disposed on either side of the center line of the segment. This construction forms another feature of the present invention and ancillary thereto are the novel ways of closing the gaps between adjacent segments while electrically insulating the said segments from each other.

I have also found that when the channel-defining segments are mounted with their edges closely contiguous as above described, the electrostatic field acting between the cathode and the segments is such as to bend the electron beam toward the center of each segment as that particular segment is being excited by the corresponding polyphase source. This tendency of the beam to "stick" at the center part of each segment occurs at all but two instants, first when one of the phase voltages is at a maximum, and second when two adjacent phase voltages are at the same magnitude. When the channel-defining windows are evenly spaced around the cathode, this bending or sticking tendency results in a greater time spacing between output pulses or pips as the electron beam passes from one window to the next window of the screen segment, and also results in a smaller time spacing when the beam passes from one segment to the next adjacent segment. This uneven time spacing is objectionable in some fields of use.

Accordingly, it is another object of the present invention to provide a channel-defining screen structure for tubes of the type described, wherein the channel-defining windows are relocated in the screen segments closer to the center of each segment than would otherwise be the case, so that the time required for the beam to pass from one window to the next adjacent window is uniform throughout the entire rotary traverse of the focussed beam.

Another feature of the invention relates to what may be termed a "gapless" channel-defining screen structure for tubes of the type described, with unevenly spaced channel-defining windows to obtain greater uniformity between the respective output channels and to obtain a uniform time intercept of the beam with the successive channels.

Another feature relates to the novel organization, arrangement and relative location of parts which cooperate to provide an improved tube of the focussed radial rotary beam type.

Other features and advantages not particularly enumerated, will be apparent after a consideration of the following detailed descriptions and the appended claims.

In the drawing,

Fig. 4 is a developed view of part of the blank from which the channel-defining segments of Figs. 2 and 3 are formed.

Fig. 5 represents a modification of the blank of Fig. 4.

Fig. 6 illustrates two channel-defining segments formed from the blank of Fig. 4.

Fig. 7 represents a modification of the channel-defining segments of Fig. 6.

Figs. 8 through 14 are schematic views of alternative manners of effectively closing the gaps between adjacent channel-forming segments, while electrically insulating them from each other.

Fig. 20 is a view of a modified windowed segment.

Inasmuch as the features of the present invention are concerned primarily with the construction of the channel-defining screen electrodes or segments, only those parts of a focussed rotary radial beam tube will be described herein as are necessary to an understanding of the features and objects of the invention.

Figure 1:
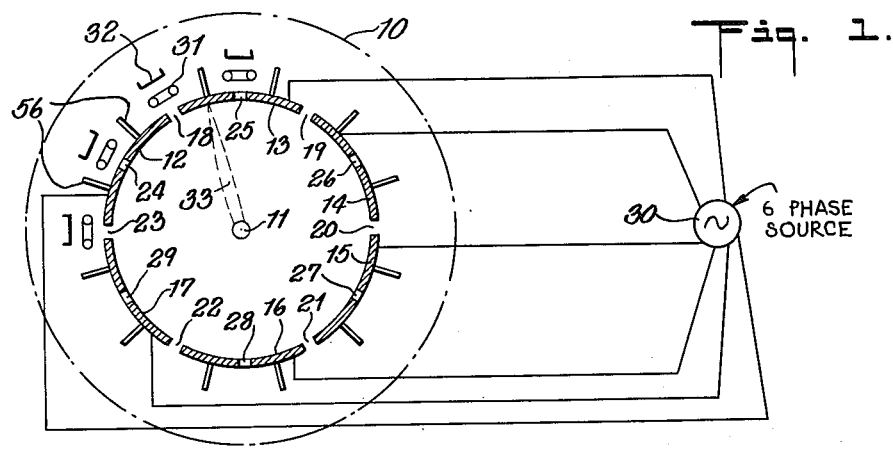
Fig. 1 represents, in schematic form, the prior known structure of radial beam tube and excitation source.

Fig. 1 shows, in schematic form, a 12-channel focussed rotary radial beam tube, such as described in detail in the said U. S. Letters Patent No. 2,433,403, or as disclosed in the said "Proceedings of the I. R. E." The tube, in general, comprises an evacuated enclosing envelope 10, having a central electron-emitting cathode 11 which is surrounded by a series of channel-defining segments 12—17. In the case of a 12-channel tube, there will be six of such segments, each spaced apart an appropriate distance to form six channel-defining gaps 18—23. Likewise, each of the segments 12—17 has centrally formed in the body thereof a channel-defining window 24—29. The segments are in the form of cylindrical arcs and are of equal widths, so as to form a concentric array around the cathode, and therefore with all the channel-defining windows symmetrically and equally spaced around the cathode. The said segments are connected to a suitable polyphase source 30. Thus in the case of a 6-segment 12-channel tube, the source 30 may be a 6-phase source. Mounted in radial alignment with the channel-defining windows 18—29 is a corresponding set of channel electrodes, each set comprising for example a control grid 31 and a corresponding output anode 32. Merely for simplicity in the drawing, only four sets of such output electrodes are shown in Fig. 1. As described in detail in said patent and publication, the cathode 11 is suitably biased with respect to the segments 12—17 and with respect to the voltage of source 30, so as to form the electrons from the cathode into a single focussed radial sheet-like beam 33 which rotates at a uniform rate, thus successively rendering effective each of the successive output channels.

With this type of construction wherein the channel-defining windows are arranged in a single tier or level, there is a practical limitation to an increase in the number of channels. As the number of channels increases, for a given radius, the width of the channels, the width of channel-defining windows and all the cooperating electrodes behind the windows must decrease in inverse proportion. This means that the spacing between the channel-separating fins, the anode width, the grid side rod size and center-to-center distance as well as the spacing between these grids and the fins must accordingly be decreased. Once the individual channels are "shrunk" to the limit of mechanical tolerance, additional channels can be added only by increasing the circumference of the structure, that is by increasing the radius of the screens.

Figure 2:
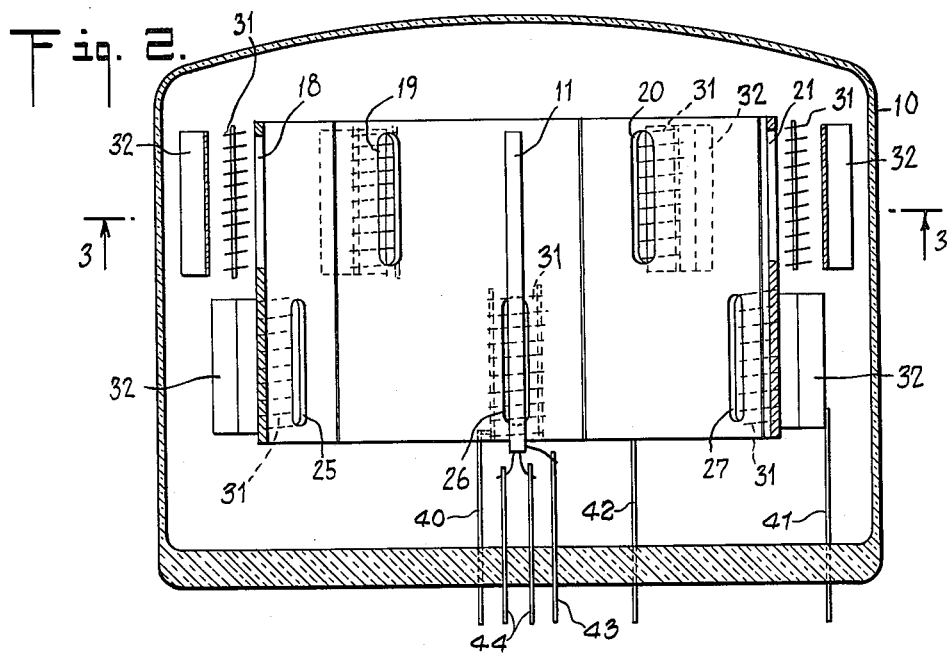
Fig. 2 is a sectional view, in elevation, of a tube embodying certain features of the invention.
Figure 3:
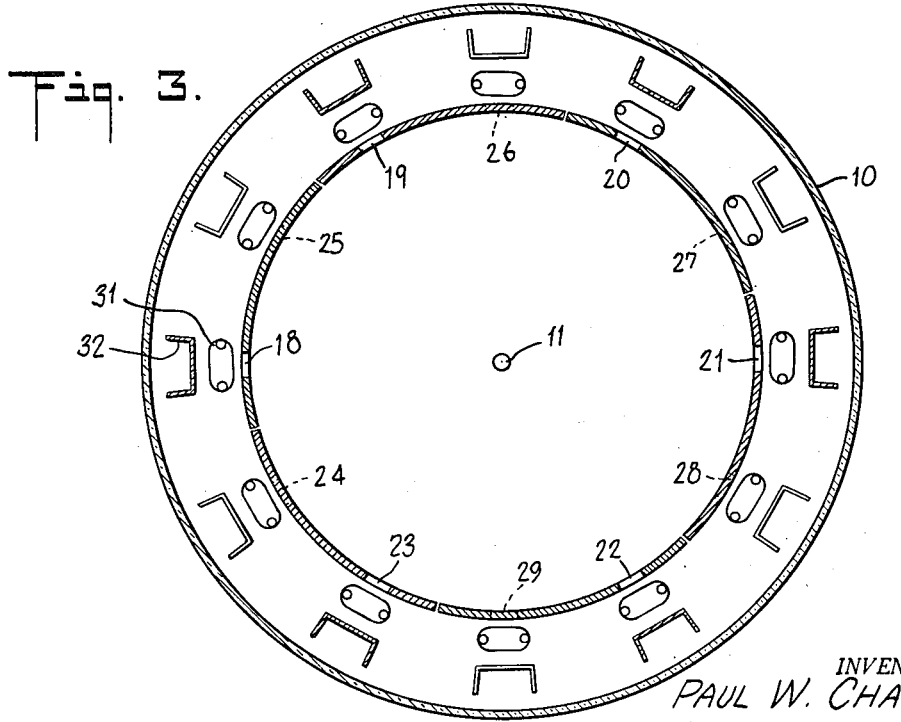
Fig. 3 is a sectional view of Fig. 2, taken along the line 3—3 thereof.

I have found that this difficulty can be overcome by forming the segments 12—17 with a series of staggered windows instead of a single window per segment. Thus, as shown in Figs. 3-4, the various segments may be formed from a single metal blank 34 having two rows of channel-defining windows preformed therein, but with the windows in one row staggered with relation to the windows in the other row. This blank can then be severed, for example, along the dotted lines 35, 36, etc., and the severed segments can then be suitably shaped to the desired cylindrical arcuate form. Each segment then comprises a pair of vertically-arranged channel-defining windows which are staggered along the width of the segment. It will be understood, of course, that the original blank 34 has the windows formed therein so that successive windows in each row are equally spaced. In order to avoid cross-talk between the various output channels, the distance $q$ between the adjacent edges of successive windows must be equal to, or greater than, the beam width, so that the beam under no conditions can partially overlap two successive windows at a time. It will be clear, therefore, that the angular distance between windows in the same row, which is a measure of the room available to accommodate the respective output channel elements, is proportionately greater than where the windows are not staggered. With this arrangement therefore, the segments can be mounted closer to the cathode, and this decrease in spacing can be practically in inverse proportion to the number of tiers or rows of staggered channel-defining windows that are used. It will be understood, of course, that the invention is not limited to the utilization of two rows of such windows, that is, two staggered windows per segment. For example, as shown in Fig. 5, the metal blank 39 can be provided with three rows of staggered windows. In any case, the length of the cathode 11 should be commensurate with the total height of the segments, as shown in Fig. 2. Figs. 2 and 3 are respective elevation and plan sectional views of a tube embodying segments made from the blank of Fig. 4. The parts shown in Figs. 2 and 3 which are functionally the same as corresponding parts of Fig. 1, bear the same designation numerals. For simplicity, the various lead-in wires to the channel-defining segments, control grids and anodes, are omitted as all the various channel separating fins 56. However, the respective channel output electrodes 31 and 32 need have a length commensurate with the length of the corresponding channel-defining window only. It is understood that each grid 31 has a corresponding lead-in wire 40 sealed through the glass bulb 10 for connection to a corresponding signal input channel; and each corresponding output anode 32 likewise has an individual lead-in wire 41 sealed through the wall of the bulb 10 for connection to the corresponding output channel. Likewise, each of the channel-forming segments is provided with a corresponding lead-in wire 42 sealed through the bulb wall for connection to the source 30. In addition, the cathode 11 is provided with a corresponding lead-in wire 43 for connecting it to a corresponding suitable direct current biassing source. It will also be understood that the usual heater element for the cathode 11 (not shown) is provided with corresponding lead-in wires 44 sealed through the bulb wall.

In order that the various segments containing the channel-defining windows may be mounted substantially contiguous while being electrically insulated, any well-known means for effecting this insulation may be employed. Preferably however, the various segments, instead of being in physical abutting relation, may be mounted in gapped relation and suitably designed so that the electrons from the beam are blanked-off at the gaps before they can reach the corresponding output electrodes. Thus as shown in Fig. 8, portions of two successive segments 45, 46, have a gap 47 therebetween, and mounted adjacent the gap on the opposite side from the cathode is a metal rod 48 which can be connected to a suitable potential or ground to intercept the electrons which would otherwise pass through the gap 47.

Fig. 9 shows a modification, wherein the gap 47 is effectively blanked by a metal T-shaped strip 49.

Fig. 10 shows another modification, wherein the adjacent edges of the segments are bent back and interlocked with a layer of intervening insulation 50.

Fig. 11 is a modification, wherein one of the segments, for example segment 46, has an off-set edge 51 which overlies the gap 47.

Fig. 12 shows a modification, wherein the edges of adjacent segments are provided with elongated parallel spaced fins 52, 53, which act as an electron trap.

Fig. 13 shows a modification similar to that of Fig. 11, but with both adjacent edges of adjacent segments off-set and in overlapping spaced relation.

Fig. 14 is a further modification, wherein one of the adjacent segments alone has an off-set portion 54 to blank-off the gap, and an integrally radially extending fin 55.

It should be observed that in the embodiments of Figs. 9, 12 and 14, the radially extending fins may form the channel-separating fins, as described for example in the said patent, and as schematically illustrated by the numeral 56 (Fig. 1).

Fig. 7 shows a modification of Fig. 6, in that the adjacent channel-defining segments are in non-gapped but insulated abutting relation at their lower portions 57 and are provided with a gap or window 58 at their upper portions 59. In other words, the gap 58 performs the same function as the remaining channel-defining windows in the upper row. However, as shown in Fig. 7, the next gap 60 between adjacent segments is disposed at the lower portion of the segments so as to form in effect a staggered window with the next preceding window in the body of the segment proper.

Figure 15:
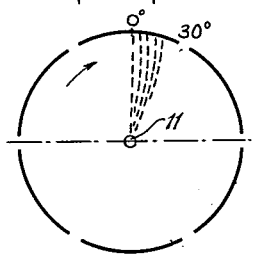
Figs. 15, 16 and 17 are schematic views explanatory of certain phases of the operation of a tube of the type described having window-defining gaps between adjacent segments.
Figure 16:
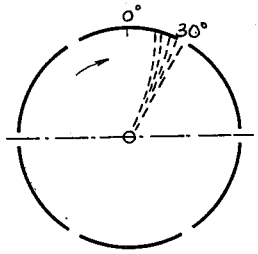
Figure 17:
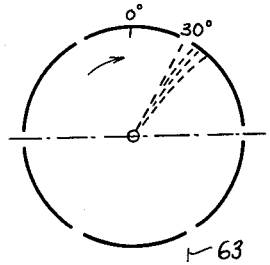
Figures 18, 19:
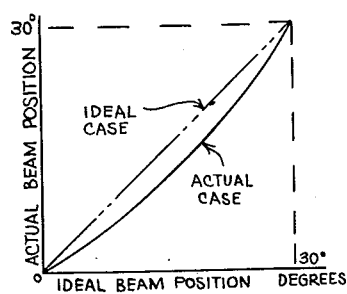
Figs. 18 and 19 are graphs, also explanatory of the invention.

In all the foregoing embodiments the various channel-defining windows are equally spaced around the cathode, whether they are in the form of cut-outs in the body of each segment as shown in Fig. 6, or are formed of such cut-outs and intervening gaps such as gap 58. Thus by eliminating the slots such as lots 18—23 (Fig. 1) between adjacent segments, for example by reducing the inter-segment spacing to the minimum tolerable with adequate insulation; and forming the windows in each segment so that the center lines 61, 62 (Fig. 7A) of each window in the segment are spaced from the center line 63 of the segment the same distance that the said center lines 61 and 62 are spaced from the vertical edges of the segment, then by positioning the segments in substantial abutting relation all the windows will be equally spaced around the cathode. It was found that with such an arrangement, the voltage acting on the electron beam as the beam passes each window, is identically the same. However, because of the non-ideal electrostatic field which is set up between the cathode and the surrounding segment array, the electrons in the beam tend to bend toward the center of each screen segment at all but two instants of time, namely when a phase voltage applied to any given segment is at a maximum, and when the phase voltages applied to two adjacent segments are at the same magnitude. In other words, the beam tends to "stick" to the center of the segment. On the other hand, when the beam reaches the adjacent edges of two segments, it tends to "whip" past this region. This condition is diagrammatically illustrated in Figs. 15, 16 and 17, and is graphically shown in Figs. 18 and 19. For example, when the beam from the cathode 11 is impinging upon the central portion of a segment, it is substantially linear, but as it approaches the edge of the segment while rotating in the direction of the arrows, it tends to bend and remain on the segment. When it clears the edge of the segment, it again tends to assume its linear form as shown in Fig. 16, so that when it impinges upon the next adjacent segment, it again assumes a bent condition as illustrated in Fig. 17. The net result is that if the gaps between adjacent segments are used as entrance slots or windows for the electron beam, the beam whips past these gaps at a faster rate than it moves past the windows formed in the body of the segment. Consequently, if all the windows are physically evenly spaced around the cathode, this condition results in a greater time spacing between the pips or pulses as the beam passes from one window to the next window in the body of the segment, while resulting in a smaller time spacing when the beam passes from one segment to the next. This condition is accentuated in constructions where the gaps between adjacent segments are used as channel-defining windows (see Fig. 1), but is also existent where no such gaps are used as in the embodiments of Figs. 2–7. The net result is that the intercept time with the successive surrounding channels will not be uniform as illustrated in Figs. 18 and 19.

Figure 21:
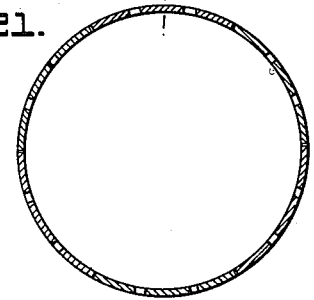
Fig. 21 is a cross-sectional plan view of a complete segment array formed from units such as shown in Fig. 20.

I have found that this condition can be overcome by decreasing the spacing between the windows formed in the body of each segment. Thus, as shown in Fig. 20, the segment comprises two windows, which are located closer to the center line 63 than they are to the lateral edges of the segment. This results in a distribution of the channel-defining windows as schematically illustrated in the plan cross-sectional view of Fig. 21, from which it will be seen that in each segment the pairs of windows therein are located closer to the center line of the segment than they are from the edge of the segment. It was found that with this construction the time required for the beam to pass from one window to the next, can be made the same throughout the entire rotational traverse of the beam.

It will be understood, of course, that the invention is not limited to any particular number of channel-defining windows, for example while tubes have been made with twelve channels per tube embodying the above principles, tubes having twenty-four or more channels can be used in accordance with the teachings of the invention.

Various changes and modifications may be made in the disclosed embodiments, without departing from the spirit and scope of the invention.

What is claimed is:

1. In an electron tube of the type described and in combination, a central electron-emitting cathode, channel-defining screen electrode means surrounding the cathode to form the electrons into a radially extending sheet-like beam, said electrode means being in the form of cylindrical arcuate segments one for each phase of a polyphase excitation source, said segments being mounted concentrically around the cathode and with each segment having at least a pair of channel-defining windows in staggered relation considered around the cathode, and channel output electrode means in radial alignment with each of said windows, all said windows being substantially parallel to each other and to the major axis of the cross section of the beam.

2. The combination according to claim 1, in which said segments are mounted with adjacent edges substantially contiguous but electrically insulated from each other, and means for connecting each segment to a corresponding phase of the polyphase source.

3. The combination according to claim 1, in which said windows are arranged in tiers, and said cathode is substantially coextensive in length with all the tiers.

4. The combination according to claim 1, in which said segments are mounted in adjacent relation with adjacent edges of adjacent segments having a portion thereof cut away to form an inter-segment channel-defining gap extending only partially along the segments.

5. The combination according to claim 1, in which said segments are mounted with their edges substantially contiguous but in slightly gapped relation, and barrier means are provided for effectively closing the gap between adjacent segments against the passage of said beam therethrough.

6. The combination according to claim 5, in which said barrier means comprises a flanged member bridging said gap but electrically insulated therefrom.

7. The combination according to claim 5, in which said barrier means comprises an offset flange on the edge of one of said segments and overlapping the adjacent edge of the other segment but in spaced relation thereto.

8. The combination according to claim 5, in which said barrier means comprises at least one flange extending radially outward from one of the segments.

9. In an electron tube of the type described and in combination, a central electron-emitting cathode, channel-defining screen electrode means surrounding the cathode to form the electrons into a single radially extending sheet-like focussed beam, said screen electrode means comprising a series of rows of channel-defining windows with the windows in each row in staggered relation to the windows in the other row in a direction considered around the cathode, the successive windows in two successive rows having their adjacent edges spaced apart a distance not less than the width of said beam and respective channel output electrode means in alignment with each of said windows, all said windows being substantially parallel to each other and to the major axis of the cross section of the beam.

10. The combination according to claim 9, in which all the windows in each row are equally spaced, and all the successive windows in successive rows are also equally spaced.

11. In an electron tube of the rotary beam type and in combination, a central electron-emitting cathode, screen electrode means surrounding the cathode to form the electrons into a single radial focussed sheet-like beam, said electrode means comprising a series of cylindrical arcuate segments each segment having in the body thereof at one level at least one complete channel-defining window, each segment also having a cut-away portion at one edge at another level and in alignment with a corresponding cut-away portion on the edge of an adjacent segment to form a channel-defining window at a different level, all said windows being substantially parallel to each other and parallel to the axis of the beam rotation.

12. Electron tube apparatus of the rotary beam type and in combination, a central electron-emitting cathode, screen electrode means, said electrode means comprising a series of cylindrical arcuate segments mounted in adjacent but electrically insulated relation around the cathode, each electrode having a plurality of channel-defining windows in the body thereof, a polyphase excitation source having the phases connected respectively to said segments to rotate the beam, the spacing between successive windows in a segment being smaller than the spacing between successive windows in successive segments for the purpose set forth, all said windows being substantially parallel to each other and parallel to the axis of the beam rotation.

13. Electron tube apparatus according to claim 12, in which each of said segments has at least two windows in the body thereof, said windows being spaced equally on opposite sides of the center line of the segment but with the distance from the center line less than the distance from the segment edge.

14. In a focussed rotary radial beam tube of the type having a central electron-emitting cathode surrounded by a cylindrical array of screen segments and with the segments biassed with respect to the cathode to focus the electrons into a sheet-like beam extending radially between the cathode and segments, a polyphase source acting on said beam to rotate it at a predetermined rate, each of said segments having a pair of channel-defining windows in the body thereof, the spacing between each pair of windows in each segment being less than the spacing between one window in a segment and the next succeeding window in a succeeding segment to produce uniform time intercepts between the rotating beam and said windows.

PAUL W. CHARTON.

REFERENCES CITED

The following references are of record in the file of this patent:

UNITED STATES PATENTS

| Number | Name | Date |
| --- | --- | --- |
| 2,217,774 | Skellett | Oct. 15, 1940 |
| 2,433,403 | Skellett | Dec. 30, 1947 |
| 2,513,947 | Levy | July 4, 1950 |
| 2,533,401 | Schramm | Dec. 12, 1950 |
| 2,533,405 | Skellett | Dec. 12, 1950 |